US010263377B2

(12) United States Patent
Ho et al.

(10) Patent No.: US 10,263,377 B2
(45) Date of Patent: Apr. 16, 2019

(54) CRIMPING CLAMP

(71) Applicant: Hanlong Industrial Co., Ltd., New Taipei (TW)

(72) Inventors: Hsing-Chieh Ho, New Taipei (TW); Chien-Wei Huang, New Taipei (TW); Chien-Chou Liao, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 186 days.

(21) Appl. No.: 15/339,974

(22) Filed: Nov. 1, 2016

(65) Prior Publication Data

US 2017/0170618 A1 Jun. 15, 2017

(30) Foreign Application Priority Data

Dec. 11, 2015 (TW) ............................. 104220019 U

(51) Int. Cl.
*B23P 19/00* (2006.01)
*H01R 43/042* (2006.01)
*B25B 27/14* (2006.01)

(52) U.S. Cl.
CPC ......... *H01R 43/042* (2013.01); *B25B 27/146* (2013.01)

(58) Field of Classification Search
CPC ...... G01N 29/04; G01N 29/07; G01N 29/221; G01N 29/265; H01R 43/048; H01R 43/0486; H01R 43/0488; H01R 43/058; H01R 43/0207
See application file for complete search history.

(56) References Cited

U.S. PATENT DOCUMENTS 5,307,553 A * 5/1994 Frohlich .............. H01R 43/045 29/566.2
5,400,941 A * 3/1995 Schmode ............. H01R 43/042 226/127
5,500,998 A * 3/1996 Schmode ........... H01R 43/0421 29/566.4

* cited by examiner

*Primary Examiner* — Paul D Kim
(74) *Attorney, Agent, or Firm* — Alan D. Kamrath; Kamrath IP Lawfirm, P.A.

(57) ABSTRACT

A crimping clamp includes a first clamp, a second clamp, a connecting rod and a pair of jaws. The first clamp includes a first clamp body and an elastic clip body. A portion of the elastic clip body combines with the first clamp body. The second clamp includes a second clamp body and a clip body having a first end connected with the second clamp body. The connecting rod has one end connected with the first clamp body and the other end connected with the second clamp body. The jaws have one jaw combined with one end of the elastic clip body and the other jaw combined with a second end of the clip body. When the jaws crimp a bushing and a wire of larger size, the elastic clip body is deformed, such that the first clamp body rotates to a predetermined position.

5 Claims, 9 Drawing Sheets

CRIMPING CLAMP

BACKGROUND OF THE INVENTION

1. Field of the Invention

The present invention relates to a crimping clamp and, more particularly, to a crimping clamp which can be used to crimp bushings and wires of various sizes.

2. Description of the Related Art

A crimping clamp in the prior art provides a crimping opening of a single size and can crimp only bushings of a specific size onto corresponding wires. In order to solve this deficiency, a crimping clamp with movable clamps is developed, with one of the clamps disposed with a disc spring, such that the clamp is fully not fixed and is moveable. Therefore, when it is necessary to crimp bushings and wires of larger sizes, the movable clamp can be pushed by the wire and bushing to move outward, thereby finishing the crimping process.

However, the disc spring is made of special material which is expensive. In consideration of the cost issue, it is necessary to design a new crimping clamp which can crimp bushings and wires of various sizes.

SUMMARY OF THE INVENTION

It is an object of the present invention to provide a crimping clamp which can crimp bushings and wires of various sizes.

In order to achieve the above object, the present invention discloses a crimping clamp for crimping a bushing onto a wire. The crimping clamp comprises a first clamp, a second clamp, a connecting rod and a pair of jaws. The first clamp comprises a first clamp body comprising a first grip end and an elastic clip body with an elastic force. The elastic clip body is connected with the first clamp body and comprises a first crimping end. The second clamp comprises a second clamp body comprising a second grip end and a clip body comprising a second crimping end, a pivot portion and a pivot end. The pivot portion is disposed between the second crimping end and the pivot end. The pivot portion is connected with the first clamp body, and the pivot end is connected with the second clamp body. The connecting rod has one end connected with the first clamp body and the other end connected with the second clamp body. The pair of jaws has one jaw combined with the first crimping end and another jaw combined with the second crimping end. When the first grip end rotates towards the second grip end to a crimping position, the pair of jaws clamps the bushing onto one end of the wire, and when the size of the bushing is larger than a pre-determined size, the first crimping end will be driven by the elastic force to deform and move away from the second crimping end, such that the first grip end can rotate to the crimping position, thereby finishing the clamping process.

In an embodiment of the present invention, the first clamp further comprises a limit pole. The elastic clip body further comprises a through hole for the limit pole to pass through and to be disposed therein, and the size of the through hole is greater than the diameter of the limit pole. A remaining space of the through hole where the limit pole is not disposed is located between the limit pole and a side of the elastic clip body that is close to the second clamp.

In an embodiment of the present invention, the crimping clamp further comprises an adjusting mechanism. The adjusting mechanism is connected with the clip body to move the clip body away from or toward the elastic clip body.

In an embodiment of the present invention, the adjusting mechanism comprises an eccentric shaft comprising a main-axis portion and an off-axis portion. The first clamp body comprises a first shaft hole, and the pivot portion comprises a pivot hole. The main-axis portion passes through the first shaft hole to be disposed therein, and the off-axis portion passes through the pivot hole to be disposed therein. Therefore, when the eccentric shaft is rotated, the eccentric shaft moves the clip body away from or toward the elastic clip body. By this design, when the eccentric shaft is rotated, the eccentric shaft moves the clip body away from or toward the elastic clip body.

In an embodiment of the present invention, the elastic clip body is made of spring steel.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

The advantages and innovative features of the invention will become more apparent from the following detailed description when taken in conjunction with the accompanying drawings.

Please refer to FIG. 1 to FIG. 4 for structural views of a crimping clamp of the present invention.

Figure 1:
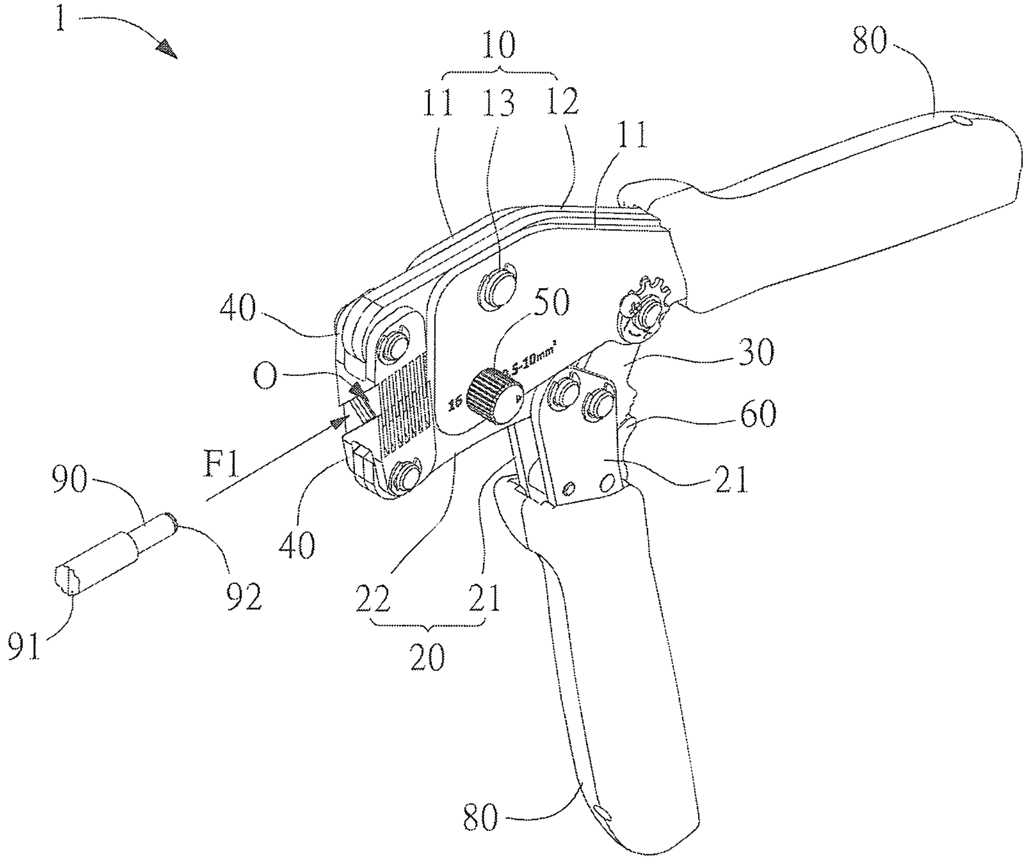
FIG. 1 illustrates a side vertical view of a crimping clamp of the present invention.
Figure 2:
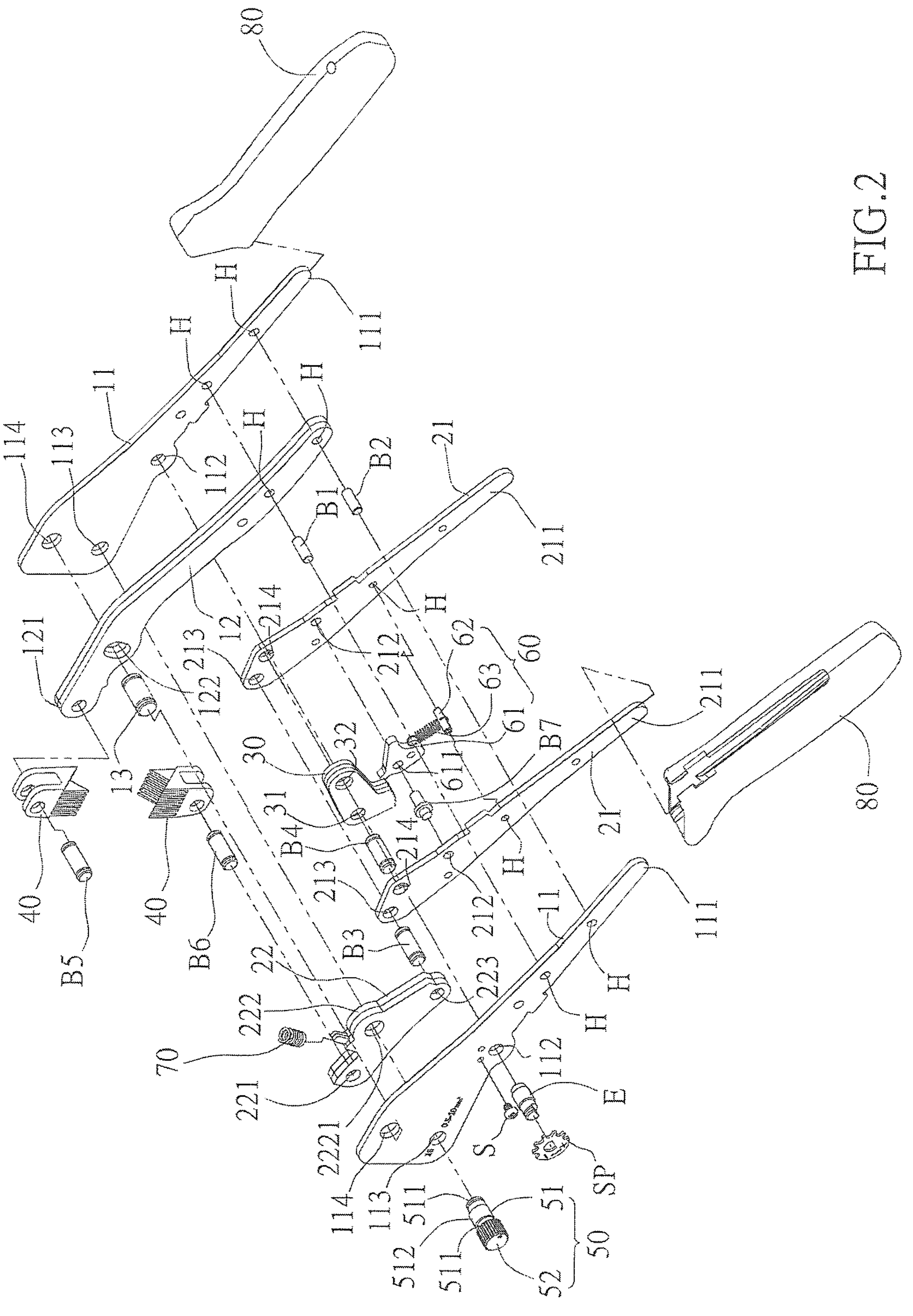
FIG. 2 illustrates an explosive view of the crimping clamp of the present invention.

As shown in FIG. 1, the present invention discloses a crimping clamp 1 for crimping a bushing 90 onto an end of a wire 91 to wrap and fix a plurality of conducting wires 92 exposed at the end of the wire 91. As shown in FIG. 1 and FIG. 2, in a preferred embodiment of the present invention, the crimping clamp 1 comprises a first clamp 10, a second clamp 20, a connecting rod 30, a pair of jaws 40, an adjusting mechanism 50, an actuating mechanism 60, a restoring spring 70, and a pair of grip sleeves 80.

In an embodiment of the present invention, the first clamp 10 comprises a pair of first clamp bodies 11, an elastic clip body 12 with an elastic fore, and a limit pole 13. In a specific embodiment of the present invention, the elastic clip body

12 is made of spring steel. However, the elastic clip body 12 can be made of any other elastic material.

Each of first clamp bodies 11 comprises a first grip end 111, a first connecting hole 112, a first shaft hole 113, a first front opening 114 and a plurality of cavities H. The elastic clip body 12 comprises a first crimping end 121, a through hole 122 and a plurality of cavities H. The elastic clip body 12 is disposed between the two first clamp bodies 11 by inserting the rivets B1, B2 through the cavities H of the first clamp bodies 11 and the cavities H of the elastic clip body 12. The limit pole 13 passes through the first front opening 114 of each first clamp body 11 and the through hole 122 of the elastic clip body 12. The size of the through hole 122 is greater than the diameter (thickness and width) of the limit pole 13, and a remaining space of the through hole 122 where the limit pole 13 is not disposed is located between the limit pole 13 and a side of the elastic clip body 12 that is close to the second clamp 20.

In an embodiment of the present invention, the second clamp 20 comprises a pair of second clamp bodies 21 and a clip body 22.

Each of the second clamp bodies 21 comprises a second grip end 211, a second connecting hole 212, a second shaft hole 213, a second front opening 214 and a plurality of cavities H. The clip body 22 comprises a second crimping end 221, a pivot portion 222 and a pivot end 223. The pivot portion 222 is disposed between the second crimping end 221 and the pivot end 223, and the pivot portion 222 is disposed with a pivot hole 2221. The clip body 22 is disposed between the two second clamp bodies 21 by inserting the rivet B3 through the second shaft holes 213 of the second clamp bodies 21 and a hole on the pivot end 223 of the clip body 22.

Figure 3:
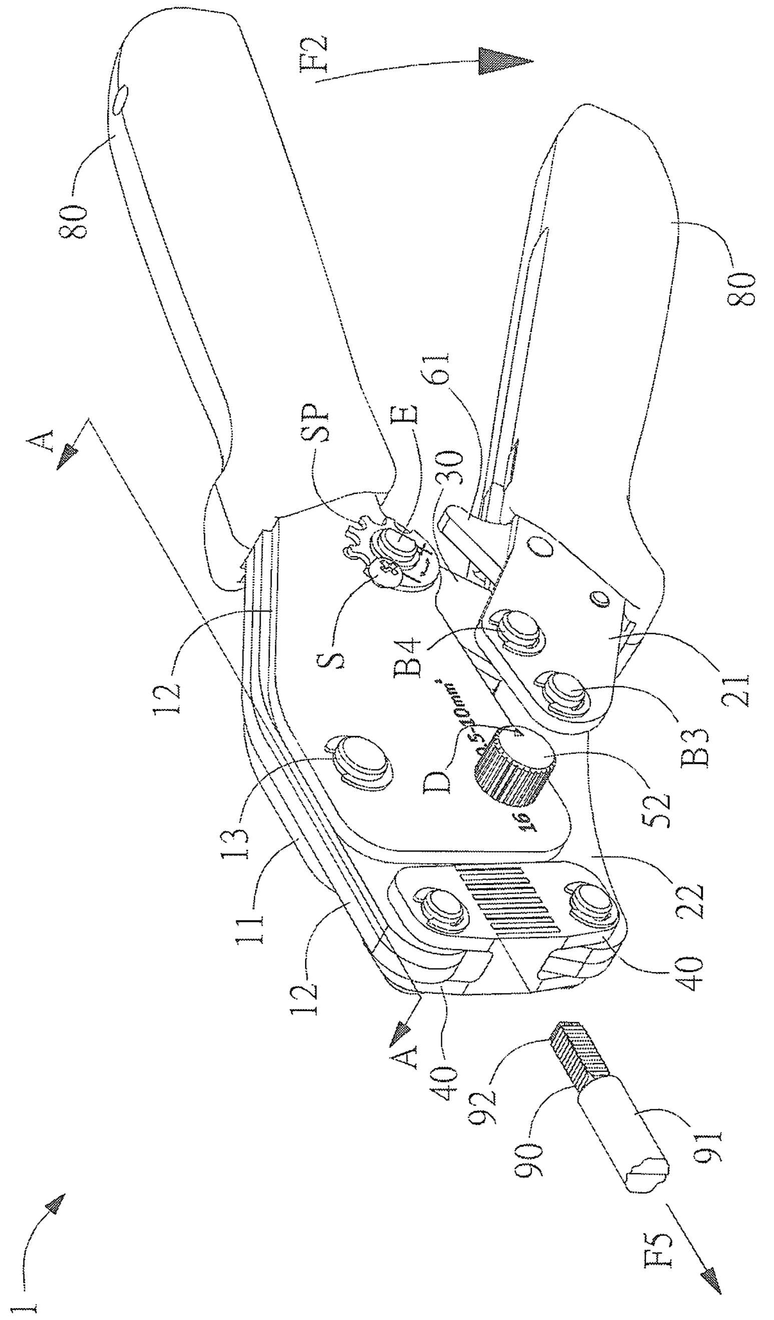
FIG. 3 illustrates another side vertical view of the crimping clamp of the present invention.

In an embodiment of the present invention, the connecting rod 30 comprises a front-end hole 31 and a back-end hole 32. One end of the connecting rod 30 is pivotally connected with the second clamp bodies 21 by inserting the rivet B4 through the second front opening 214 of each second clamp body 21 and the front-end hole 31 of the connecting rod 30. The other end of the connecting rod 30 is connected with the first clamp bodies 11 by inserting the second eccentric shaft E through the first connecting hole 112 of each first clamp body 11 and the back-end hole 32 of the connecting rod 30. A gear plate SP disposed on one end of the second eccentric shaft E can be used to fine-tune the position of the back-end hole 32 of the connecting rod 30. During normal use, the gear plate SP is fixed by the screw S on the side thereof (as shown in FIG. 3).

In an embodiment of the present invention, one of the two jaws 40 is combined with the first crimping end 121 by inserting the rivet B5 through a hole on the jaw 40 and a hole on the first crimping end 121 of the elastic clip body 12. The other jaw 40 is combined with the second crimping end 221 by inserting the rivet B6 through a hole on this jaw 40 and a hole on the second crimping end 221 of the elastic clip body 22. When the two jaws 40 are combined with the first crimping end 121 and the second crimping end 221 respectively, an opening O is formed between the two jaws 40 (as shown in FIG. 1).

In an embodiment of the present invention, an adjusting mechanism 50 is connected with the clip body 22. The adjusting mechanism 50 is used for adjusting the clip body 22 to move away from or toward the elastic clip body 12. In other words, the adjusting mechanism 50 can be used to adjust the size of the opening O formed by the two jaws 40 (details described below). In a specific embodiment of the present invention, the adjusting mechanism 50 comprises an eccentric shaft 51 and an operating member 52. The eccentric shaft 51 comprises two main-axis portions 511 and an off-axis portion 512 disposed between the two main-axis portions 511, and the operating member 52 is combined with one end of the eccentric shaft 51. Each of the two main-axis portions 511 passes through the first shaft hole 113 of each of the first clamp bodies 11 respectively, and the off-axis portion 512 passes through the pivot hole 2221 of the clip body 22.

In an embodiment of the present invention, an actuating mechanism 60 comprises an actuating member 61, a fixation rod 62, and a spring 63. The actuating member 61 is disposed between the two second clamp bodies 21 by inserting the rivet B7 through the coupling hole 611 on the actuating member 61 and the two second connecting holes 212 of the two second clamp bodies 21. One end of the actuating member 61 is engaged with one side of the connecting rod 30. The fixation rod 62 passes through the corresponding cavities H of the two second clamp bodies 21. One end of the spring 63 is connected with the actuating member 61, and the other end is connected with the fixation rod 62 (as shown in FIG. 4).

Figure 4:
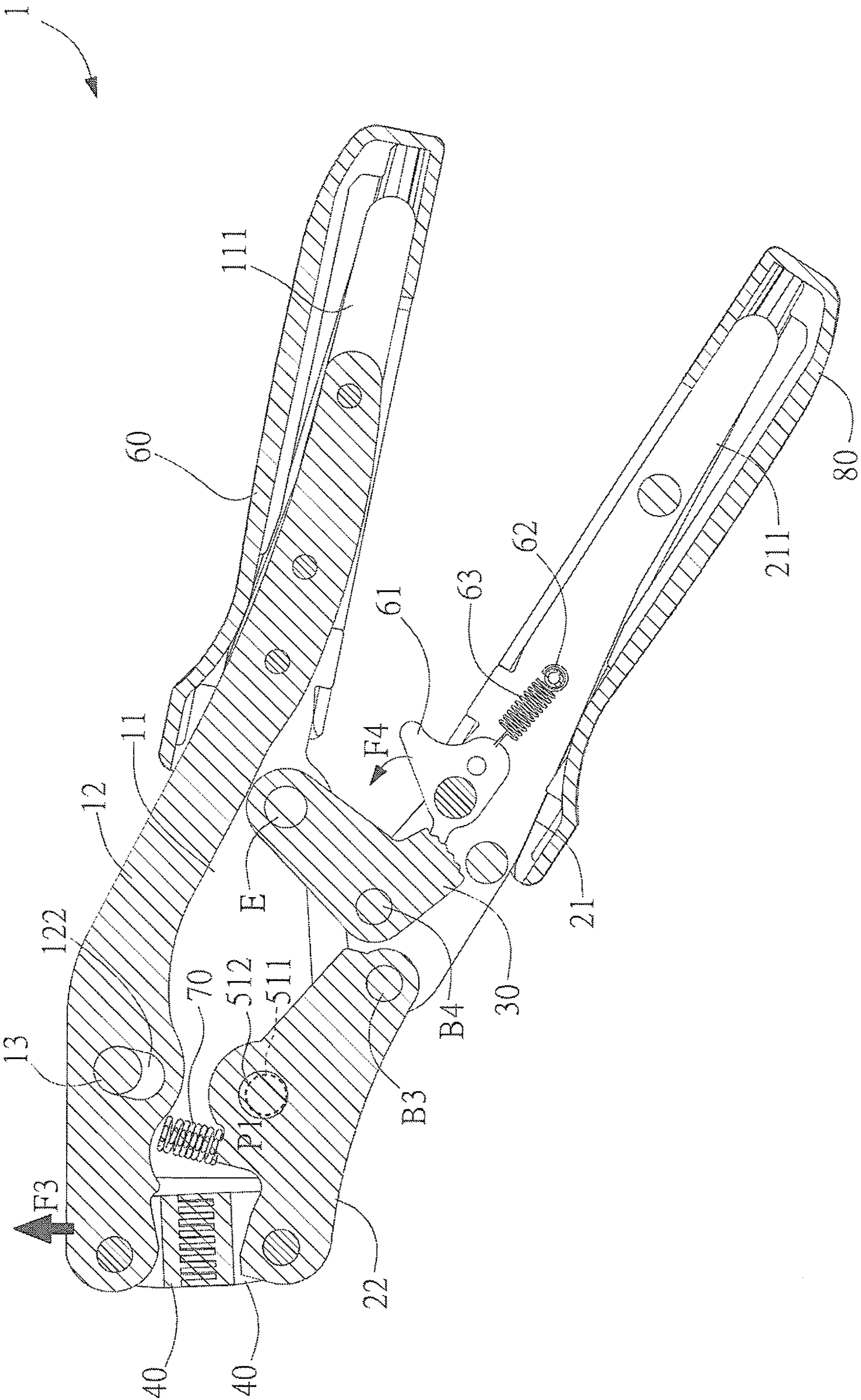
FIG. 4 illustrates a cross-sectional view of the crimping clamp along the A-A line of FIG. 3.

As shown in FIG. 4, in an embodiment of the present invention, one end of the restoring spring 70 is connected with the elastic clip body 12, and the other end of the restoring spring 70 is connected with the clip body 22. When a user grips the first grip end 111 and the second grip end 211 to press the clip body 22 and thereby cause it to move towards the elastic clip body 12, the restoring spring 70 will be compressed and thus generates an elastic force on the clip body 22.

In an embodiment of the present invention, the two grip sleeves 80 are combined with the first grip end 111 and the second grip end 211 respectively and wrap the first grip end 111 and the second grip end 211.

Now, please refer to FIG. 1 to FIG. 9. As shown in FIG. 1, when the user wants to use the crimping clamp 1 to crimp the bushing 90 onto one end of the wire 91, first the user puts the bushing 90 on one end of the wire 91, and, then, the user brings the wire 91 and the bushing 90 to the opening O formed by the two jaws 40 (shown by the arrow F1 in FIG. 1).

When one end of the wire 91 wrapped by the bushing 90 is put into the opening O, as shown in FIG. 3, the first grip end 111 and the second grip end 211 are gripped for being joined together (shown by the arrow F2 in FIG. 3), such that the first grip end 111 rotates towards the second grip end 211 to a crimping position. At this time, the two jaws are in close contact with each other and generate a clamping force to crimp the bushing 90 and wire 91 together. As shown in FIG. 3 and FIG. 4, in the embodiment of the present invention, the first clamp body 11, the connecting rod 30, the second clamp body 21 and the clip body 22 are linked together to form a toggle mechanism. Therefore, when the first grip end 111 rotates to the crimping position, the second eccentric shaft E going through the first connecting hole 112 and the back-end hole 32 will move to a position substantially aligned in a diagonal line with the position of the rivet B4 going through the second front opening 214 and the front-end hole 31, with the rivet B3 going through the second shaft hole 213 and the hole on the pivot end 223 (that is, the first connecting hole 112, the second front opening 214, and the second shaft hole 213 are substantially aligned linearly). At this time, the first crimping end 121 and the second crimping end 221 can generate the greatest clamping force. Since the toggle mechanism is known in the art for its structure and operation principle, the reason why the first crimping end 121 and the second crimping end 221 can generate the greatest clamping force when the second eccentric shaft E, the rivet B4 and the rivet B3 are aligned in a diagonal line will not be further described for the sake of brevity.

Figure 9:
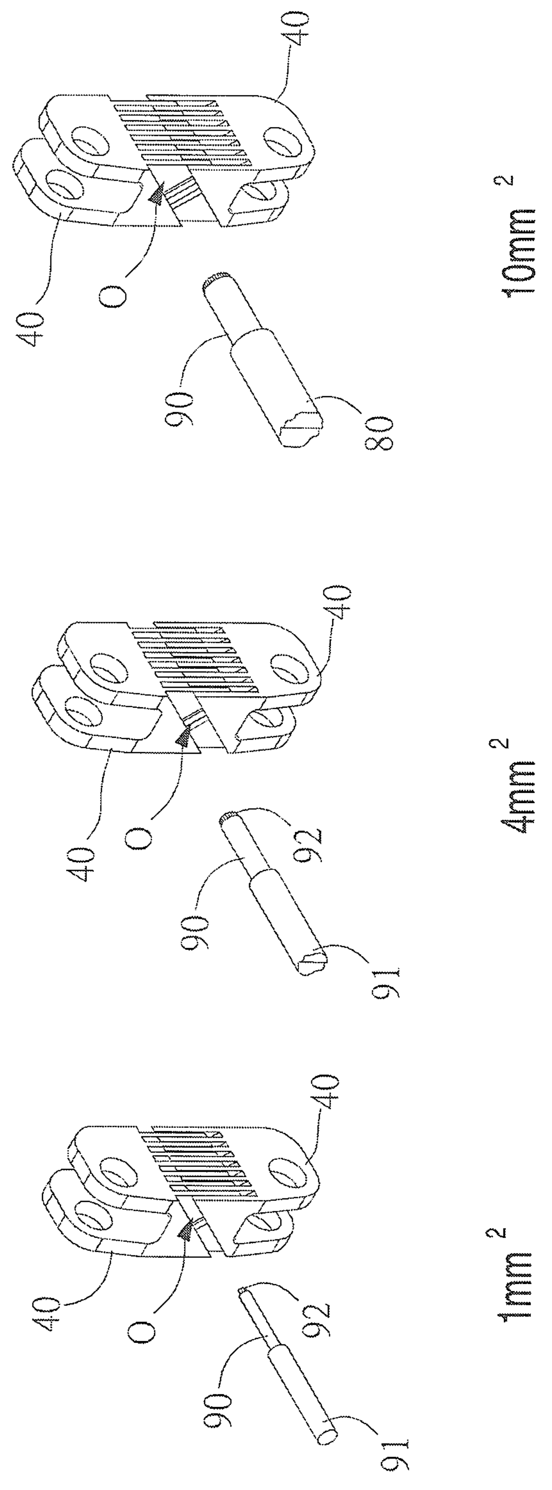
FIG. 9 illustrates the sizes of the opening between the jaws when crimping bushings and wires of various sizes.

FIG. 9 lists the possible sizes of wire 91 and bushing 90. However, there can be other possible sizes. As shown in FIG. 3 and FIG. 4, during the crimping of the wire 91 and bushing 90 of smaller sizes (such as a cross-section area of 1 $mm^2$), the first grip end 111 can be gripped and rotated to the crimping position. That is, the position where the second eccentric shaft E, the rivet B4 and the rivet B3 are aligned in a diagonal line.

However, when crimping the wire 91 and the bushing 90 of a larger size (such as cross-section area of 4 $mm^2$ or 10 $mm^2$), and since the wire 91 grows in diameter, the two jaws 40 will be stopped by the wire 91 before the first grip end 111 rotates to the crimping position. However, in the present invention, since the elastic clip body 12 of the first clamp 10 is elastic, and when the above-mentioned situation occurs, the user can continue to exert force on the first grip end 111 and the second grip end 211 to cause the portion of the elastic clip body 12 not fixed by the rivets B1, B2 to deform and move outwardly (in the direction shown by the arrow F3 in FIG. 4). That is, when a wire 91 and bushing 90 of a size larger than the predetermined size (in this example, the predetermined size is 1 $mm^2$) are crimped, the first crimping end 121 will be pressed by the elastic force of the elastic clip body 12 to deform and move away from the second crimping end 221. Once the opening O between the two jaws 40 is expanded, the first grip end 111 can be smoothly rotated to the predetermined crimping position to allow the first crimping end 121 and the second crimping end 221 to generate the greatest clamping force.

Additionally, when the size of the through hole 122 of the elastic clip body 12 is greater than the diameter (thickness and width) of the limit pole 13, and when the limit pole 13 passes through the through hole 122 of the elastic clip body 12, a remaining space of the through hole 122 where the limit pole 13 is not disposed is located between the limit pole 13 and a side of the elastic clip body 12 that is close to the second clamp 20. Therefore, when the elastic clip body 12 is pressed to deform and move, the remaining space of the through hole 122 can accommodate the deformation of the elastic clip body 12, thereby preventing the portion of the elastic clip body 12 around the through hole 122 from being affected by the counterforce of the limit pole 13, which would cause elastic fatigue, and thus extending the lifespan of the crimping clamp 1.

As shown in FIG. 4, during the crimping process, the connecting rod 30 rotates clockwise and is prevented from rotating counterclockwise by one end of the actuating member 61 engaging with the connecting rod 30. After the crimping process is finished, the user releases his or her grip on the first grip end 111 and the second grip end 211 and then rotates the actuating member 61 counterclockwise (in the direction shown by the arrow F4 in FIG. 4) to detach the actuating member 61 and the connecting rod 30. At this time, the connecting rod 30 is driven by the elastic force of the restoring spring 70 exerted on the clip body 22 to rotate counterclockwise, thereby restoring the first grip end 111 and the second grip end 211 back to the state before the user gripped the crimping clamp 1. Meanwhile, the two jaws 40 will also return to their original positions, making it possible for the user to remove the crimped wire 91 and bushing 90 from between the two jaws 40 (in the direction shown by the arrow F5 in FIG. 3).

Figure 5:
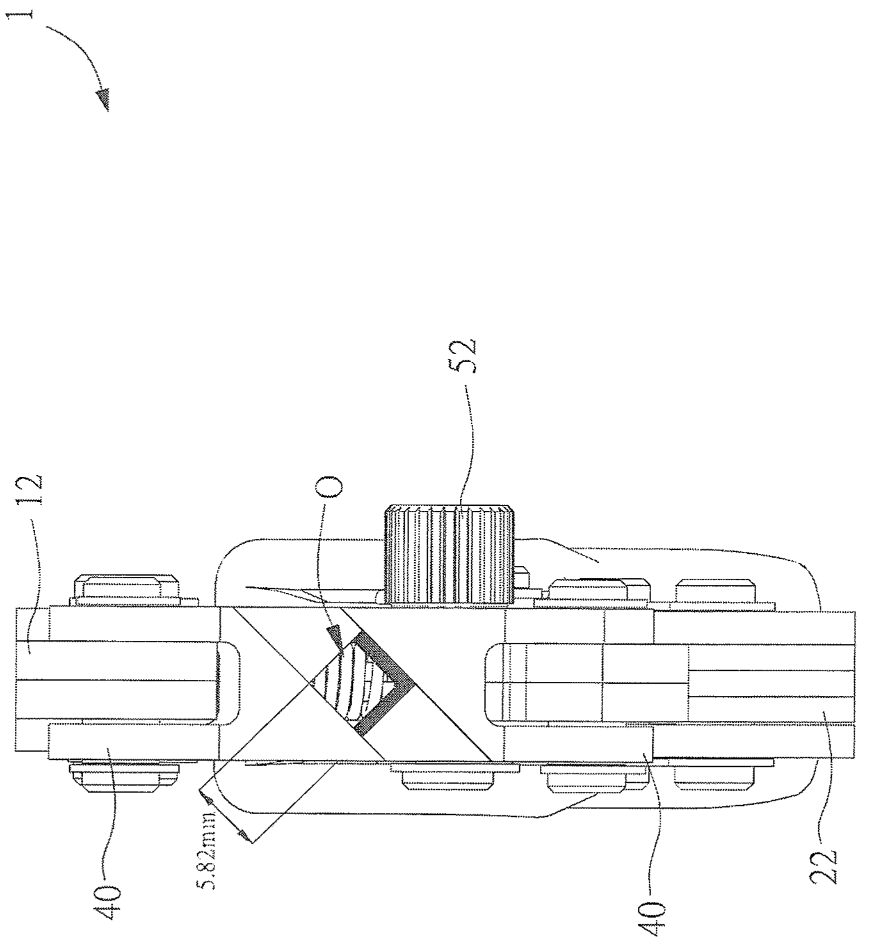
FIG. 5 illustrates a view when the jaws of the crimping clamp form a smaller opening.
Figure 6:
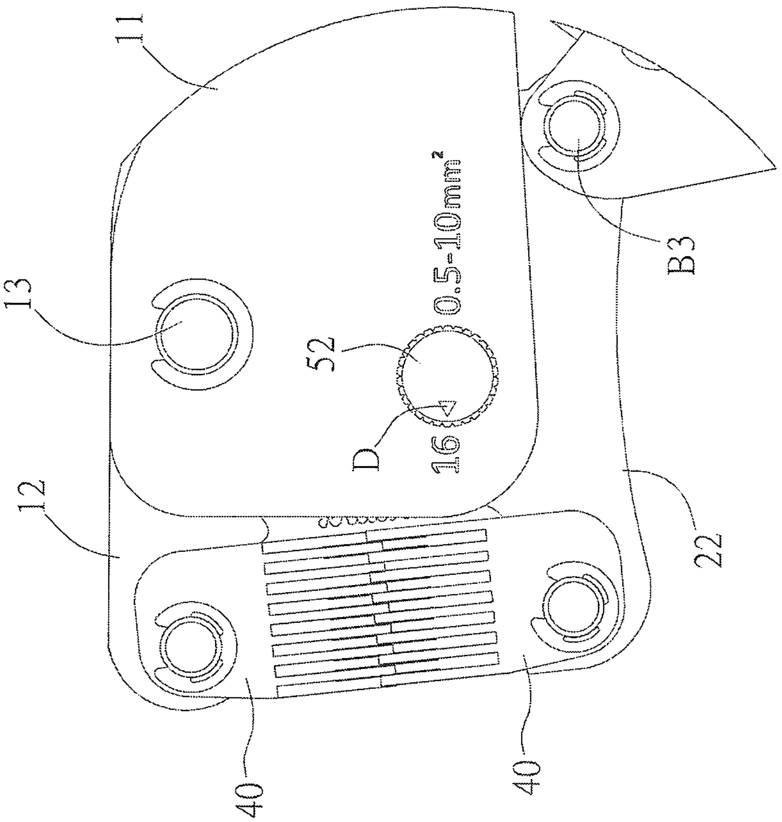
FIG. 6 illustrates a partially enlarged view of the crimping clamp of the present invention.
Figure 7:
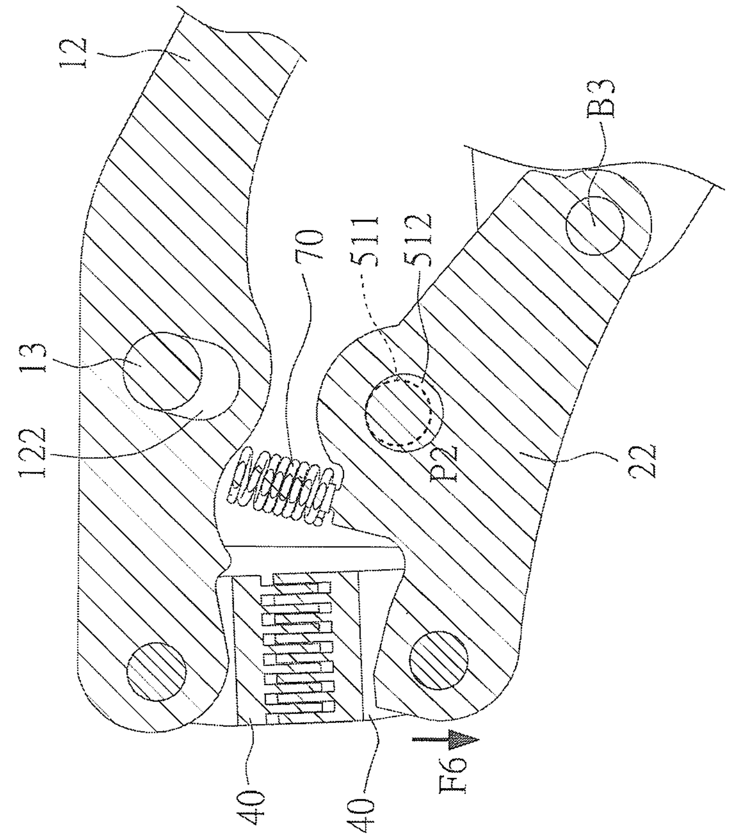
FIG. 7 illustrates a partial side view of the crimping clamp of the present invention.
Figure 8:
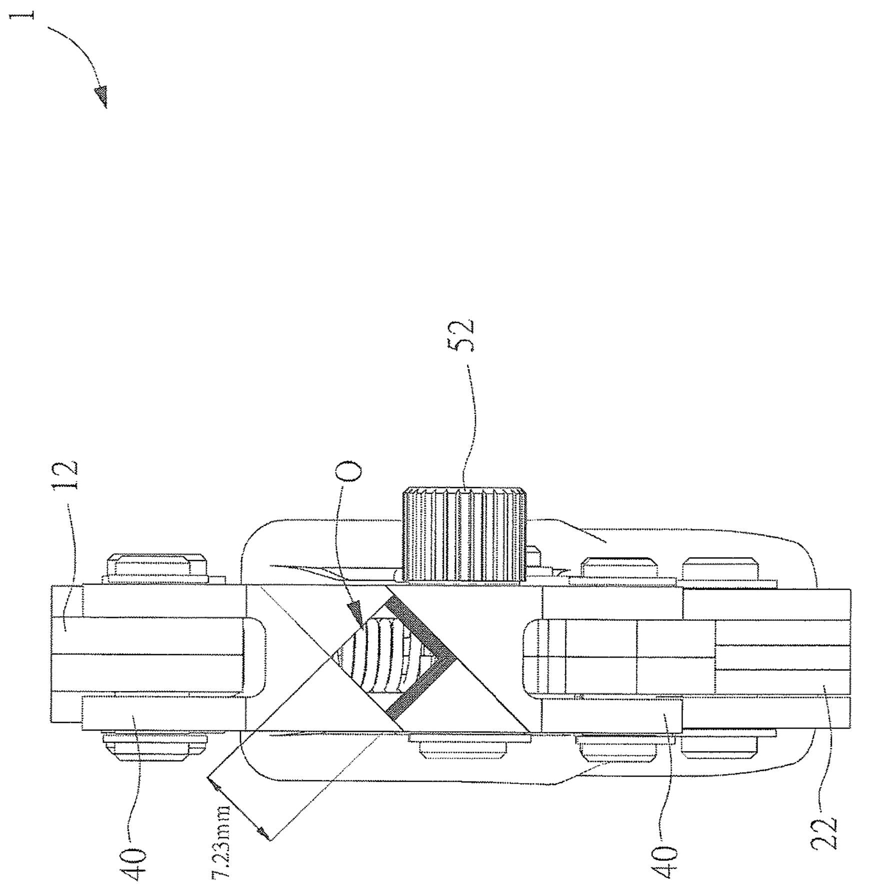
FIG. 8 illustrates a view when the jaws of the crimping clamp form a larger opening.

Additionally, the present invention provides an adjusting mechanism 50 to adjust the size of the opening O formed between the two jaws 40. As shown in FIG. 3 and FIG. 4, in an embodiment of the present invention, when the sizes of the wire 91 and the bushing 90 to be crimped by the crimping clamp 1 fall within a specific range (such as a cross-section area of under 10 $mm^2$), the user can rotate the operating member 52 to turn it to the position indicated by the arrow D in FIG. 3 and thereby to cause the axle center of the off-axis portion 512 of the eccentric shaft 51 to be situated at the first position P1. At this time, the opening O formed by the two jaws 40 can accommodate a wire 91 and bushing 90 having cross-section areas of less than 10 $mm^2$ to be placed therein (as shown in FIG. 5). However, when the size of the wire 91 and the bushing 90 exceeds a specific range (for example, cross-section areas of 16 $mm^2$), the opening O will be too small to hold the wire 91 and bushing 90. When it is necessary to crimp a bushing and wire of larger size, the user can rotate the operating member 52 by 180 degrees to turn the arrow to the position shown in FIG. 6. At this time, the axle center of the main-axis portion 511 of the eccentric shaft 51 is not at the same position as that of the off-axis portion 512 of the eccentric shaft 51. Therefore, when the main-axis portion 511 is turned by 180 degrees, the axle center of the off-axis portion 512 will move from the original first position P1 to the second position P2 (as shown in FIG. 7), which is away from the elastic clip body 12. That is, when the main-axis portion 511 rotates, the off-axis portion 512 will move away from the elastic clip body 12 and drive the clip body 22 to also move away from the elastic clip body 12 (in the direction shown by the arrow F6 in FIG. 7), thereby enlarging the aperture of the opening O formed by the two jaws 40 (as shown in FIG. 8). As a result, the opening O can hold wires 91 and bushings 90 of larger sizes.

Therefore, the present invention discloses the crimping clamp 1 which can be used for crimping bushings 90 and wires 91 of various sizes. Meanwhile, since the elastic clip body 12 of the crimping clamp 1 can be elastically deformed, the crimping clamp 1 can still hold bushings 90 and the wires 91 of larger sizes and generate the greatest clamping force possible to firmly crimp a bushing 90 onto one end of a wire 91, thereby finishing the crimping process.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A crimping clamp for crimping a bushing onto an end of a wire, with the crimping clamp comprising:

a first clamp comprising:
- a first clamp body comprising a first grip end;
- an elastic clip body with an elastic force and connected with the first clamp body; and
- a limit pole; wherein the elastic clip body comprises a first crimping end and a through hole for the limit pole to pass through and to be disposed therein, with a size of the through hole greater than a diameter of the limit pole;

a second clamp comprising:
- a second clamp body comprising a second grip end; and
- a clip body comprising a second crimping end, a pivot portion and a pivot end, wherein the pivot portion is disposed between the second crimping end and the pivot end, wherein the pivot portion is connected with the first clamp body, and wherein the pivot end is connected with the second clamp body;

a connecting rod having one end connected with the first clamp body and another end connected with the second clamp body; and a pair of jaws having one jaw combined with the first crimping end and another jaw combined with the second crimping end; wherein when the first grip end rotates towards the second grip end to a crimping position, the pair of taws clamp the bushing onto one end of the wire, wherein when the size of the bushing is larger than a pre-determined size, the first crimping end is deformed and moved away from the second crimping end by the elastic force during crimping, such that the first grip end rotates to the crimping position, and with a remaining space of the through hole where the limit pole is not disposed being located between the limit pole and a side of the elastic clip body that is close to the second clamp.

2. The crimping clamp as claimed in claim 1 further comprising an adjusting mechanism, wherein the adjusting mechanism is connected with the clip body for adjusting the clip body to move away from or toward the elastic clip body.

3. The crimping clamp as claimed in claim 1, wherein the elastic clip body is made of spring steel.

4. A crimping clamp for crimping a bushing onto an end of a wire, with the crimping clamp comprising:

a first clamp comprising:

a first clamp body comprising a first grip end; and an elastic clip body with an elastic force and connected with the first clamp body, with the elastic clip body comprising a first crimping end;

a second clamp comprising:

a second clamp body comprising a second grip end; and a clip body comprising a second crimping end, a pivot portion and a pivot end, wherein the pivot portion is disposed between the second crimping end and the pivot end, wherein the pivot portion is connected with the first clamp body, and wherein the pivot end is connected with the second clamp body;

a connecting rod having one end connected with the first clamp body and the other end connected with the second clamp body;

a pair of jaws having one jaw combined with the first crimping end and another jaw combined with the second crimping end; wherein when the first grip end rotates towards the second grip end to a crimping position, the pair of jaws clamp the bushing onto one end of the wire, and wherein when the size of the bushing is larger than a pre-determined size, the first crimping end is deformed and moved away from the second crimping end by the elastic force during crimping, such that the first grip end rotates to the crimping position; and an adjusting mechanism, wherein the adjusting mechanism is connected with the clip body for adjusting the clip body to move away from or toward the elastic clip body, wherein the adjusting mechanism comprises an eccentric shaft comprising a main-axis portion and an off-axis portion, wherein the first clamp body comprises a first shaft hole, and wherein the pivot portion comprises a pivot hole; wherein the main-axis portion passes through the first shaft hole to be disposed therein, and wherein the off-axis portion passes through the pivot hole to be disposed therein, such that when the eccentric shaft is rotated, the eccentric shaft moves the clip body away from or toward the elastic clip body.

5. The crimping clamp as claimed in claim 4, wherein the elastic clip body is made of spring steel.

* * * * *